(12) United States Patent
Savkli et al.

(10) Patent No.: US 10,839,256 B2
(45) Date of Patent: Nov. 17, 2020

(54) METHOD AND APPARATUS FOR CLUSTERING, ANALYSIS AND CLASSIFICATION OF HIGH DIMENSIONAL DATA SETS

(71) Applicant: The Johns Hopkins University, Baltimore, MD (US)

(72) Inventors: Cetin Savkli, Annapolis, MD (US); Jeffrey S. Lin, Columbia, MD (US); Philip B. Graff, College Park, MD (US)

(73) Assignee: The Johns Hopkins University, Baltimore, MD (US)

( * ) Notice: Subject to any disclaimer, the term of this patent is extended or adjusted under 35 U.S.C. 154(b) by 257 days.

(21) Appl. No.: 15/942,597

(22) Filed: Apr. 2, 2018

(65) Prior Publication Data

US 2018/0307943 A1    Oct. 25, 2018

Related U.S. Application Data

(60) Provisional application No. 62/489,486, filed on Apr. 25, 2017.

(51) Int. Cl.
| | | |
|---|---|---|
| *G06F 17/30* | (2006.01) | |
| *G06K 9/62* | (2006.01) | |
| *G06K 9/03* | (2006.01) | |

(52) U.S. Cl.
CPC ......... *G06K 9/6226* (2013.01); *G06K 9/033* (2013.01); *G06K 9/036* (2013.01); *G06K 9/6223* (2013.01); *G06K 9/6278* (2013.01); *G06K 9/6282* (2013.01)

(58) Field of Classification Search
CPC .... G06K 9/6226; G06K 9/6284; G06K 9/036; G06K 9/033; G06K 9/6278; G06K 9/6223

See application file for complete search history.

(56) References Cited

U.S. PATENT DOCUMENTS

| | | | |
|---|---|---|---|
| 6,466,946 B1 * | 10/2002 | Mishra | G06K 9/6223 |
| 7,412,429 B1 * | 8/2008 | Syeda-Mahmood | G06K 9/6226 706/45 |
| 8,548,828 B1 | 10/2013 | Longmire | |
| 2002/0042793 A1 * | 4/2002 | Choi | G06F 16/335 |
| 2007/0174268 A1 * | 7/2007 | Posse | G06F 16/355 |
| 2008/0109437 A1 * | 5/2008 | Perrizo | G06F 16/283 |
| 2012/0304288 A1 * | 11/2012 | Wright | H04L 63/1425 726/22 |

(Continued)

OTHER PUBLICATIONS

Strehl A; Relationship-based Clustering and Cluster Ensembles for High-dimensional Data Mining, May 2002, pp. 89-99 (Year: 2002).*

(Continued)

*Primary Examiner* — Albert M Phillips, III
*Assistant Examiner* — Fernando M Mari Valcarcel
(74) *Attorney, Agent, or Firm* — Noah J. Hayward

(57) ABSTRACT

An apparatus includes processing circuitry configured to execute instructions that, when executed, cause the apparatus to initialize a mixture model having a number of clusters including categorical data, iteratively update cluster assignments, evaluate cluster quality based on categorical density of the clusters, and prune clusters that have low categorical density, and determine an optimal mixture model based on the pruned clusters.

16 Claims, 10 Drawing Sheets

(56) References Cited

U.S. PATENT DOCUMENTS

2016/0179923 A1* 6/2016 Chehreghani ......... G06F 16/355
707/637

OTHER PUBLICATIONS

Tao Li; Entropy-Based Criterion in Categorical Clustering, Jul. 2004, ICML '04: Proceedings of the twenty-first international conference on Machine learning, pp. 1-8 (Year: 2004).*
Unknown Author(s), "MapReduce," Internet web page available at "https://en.wikipedia.org/wiki/MapReduce," last accessed Mar. 26, 2018, pp. 1-12.

* cited by examiner

METHOD AND APPARATUS FOR CLUSTERING, ANALYSIS AND CLASSIFICATION OF HIGH DIMENSIONAL DATA SETS

CROSS-REFERENCE TO RELATED APPLICATIONS

This application claims priority to and the benefit of prior-filed, U.S. Provisional Application Ser. No. 62/489,486 filed on Apr. 25, 2017, the entire contents of which are hereby incorporated herein by reference.

TECHNICAL FIELD

Example embodiments generally relate to techniques for clustering and classifying data or entities within large data sets and, in particular, relate to apparatuses (and/or methods executable by configured apparatuses) that are capable of analyzing high dimensional data sets, including non-numerical data, to determine, for example, whether a particular entity associated with the data is normal, classify the entity, or identify similar entities.

BACKGROUND

With the rapid growth of categorical data available for analysis, the need for robust statistical approaches is becoming ever more critical. Unlike numerical data (such as weather or astronomical data), much of the data found in social networks, and the web in general, is categorical in nature. Categorical data is data that is collected in groups or categories. While methods for analysis of numerical data are well established, methods used for analysis of categorical data are more varied and still developing.

One of the challenges in the analysis of categorical data is a lack of a natural distance metric that most statistical learning algorithms rely on. While the lack of a natural distance metric is a problem, it is also known that as the dimensionality of attribute space increases the distance metrics become less and less useful, a fact that is also known as the curse of dimensionality. The curse of dimensionality implies that in high dimensions most of the data becomes equally anomalous. Therefore, determining what constitutes an anomaly becomes a challenging task since, as the dimensionality increases, all data tends to appear to be anomalous.

The inability to reliably identify anomalies has practical consequences as human inspection of anomalies is a time-consuming activity. Categorical data, such as a cyber or financial transactions, can easily comprise dozens of attributes. Reliance on rule based or ground truth based classification approaches can be fragile, as anomalies may be subtle and the anomalies may not form a cohesive class. Such approaches effectively lead to a classification system that can primarily be used to detect predefined event classes. Therefore, it may be desirable to develop robust analytic approaches that do not require ground truth, do not rely on a distance metric, and that can handle the high dimensionality of the categorical data.

BRIEF SUMMARY OF SOME EXAMPLES

Some example embodiments may enable the provision of a probabilistic approach to data representation that addresses the challenges described above by providing likelihood measurement and clustering in a single operational run.

In one example embodiment, an apparatus including processing circuitry configured to execute instructions that, when executed, cause the apparatus to perform various operations may be provided. The operations may include initializing a mixture model having a number of clusters including categorical data, iteratively updating cluster assignments, evaluating cluster quality based on categorical density of the clusters, and pruning clusters that have low categorical density, and determining an optimal mixture model based on the pruned clusters.

In another example embodiment, a method may be provided. The method may include initializing a mixture model having a number of clusters including categorical data, iteratively updating cluster assignments, evaluating cluster quality based on categorical density of the clusters, and pruning clusters that have low categorical density, and determining an optimal mixture model based on the pruned clusters.

BRIEF DESCRIPTION OF THE SEVERAL VIEWS OF THE DRAWING(S)

Having thus described the some example embodiments of the invention in general terms, reference will now be made to the accompanying drawings, which are not necessarily drawn to scale, and wherein:

DETAILED DESCRIPTION

Figure 1:
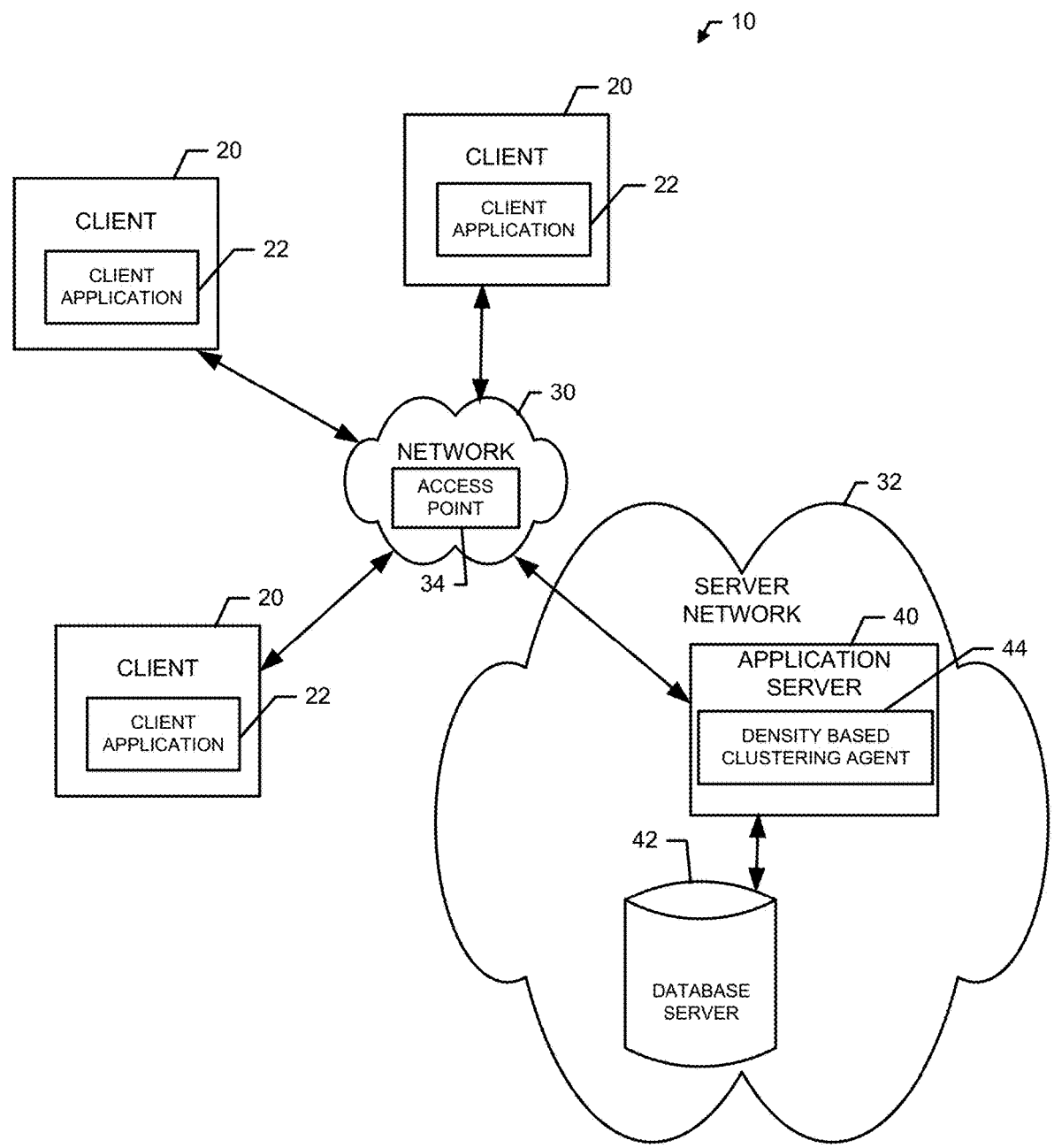
FIG. 1 illustrates a functional block diagram of a system that may be useful in connection with clustering, analysis and/or classification of high dimensional data sets according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, the term "entity" should be understood to correspond to a record (e.g., of an event, transaction, occurrence, activity, etc.), a product, a container, a person, an object, a living thing, a message, a connection, or any other thing that is characterized by a plurality of attributes as categorical data.

As indicated above, some example embodiments may relate to the provision of clustering, analysis and classification capabilities in challenging environments. In an example embodiment, a new probabilistic mixture model is provided, which applies to categorical and numerical data. The probabilistic mixture model of example embodiments can be used to measure probability of high dimensional data while also performing clustering and classification of the high dimensional data. Approaching analysis from a probabilistic perspective, where data is represented as a high dimensional mixture model, provides a transparent representation and a tool that supports most common operations such as anomaly detection, classification, and clustering.

While mixture models are a powerful tool, they are often employed for numerical data where mathematical functions, such as multivariate Gaussians, can be used. However, determining the density of numerical data is a very easy and familiar task to most people. Meanwhile, determining density within a high dimensional space can be extremely difficult to do. As such, example embodiments define a new type of density, which may be referred to as categorical density (e.g., density of non-numeric or categorical data). Categorical density may define density in terms of a particular attribute or category of data measured per a unit of categorical volume. Categorical volume is defined using entropy of attributes in each respective dimension. As a result, each mixture component captures the contribution of a dense region in the high dimensional space to the distribution in a concise way. Example embodiments therefore provide a new approach to extend mixture models to categorical attribute space by using a new definition of density (i.e., categorical density) that applies to both categorical and numerical attributes. Concept of categorical density remediates the lack of a natural distance metric in categorical space and contributes to building mixture models with high density components that represent natural clusters.

One of the challenges in categorical space is the evaluation of the quality of a mixture component. In numerical space a natural measure for quality of a component is provided by the variance of the function. High variance components represent sparsely populated regions of space not supported by a dense cluster center. Example embodiments may introduce a generalized definition of volume (i.e., categorical volume) using entropy. As such, entropy is defined as:

$$S = -\sum_{i=1}^{N} p_i \log(p_i).$$

Categorical volume may therefore be defined as:

$$v_i \equiv \prod_{i=1}^{d} d_i = \prod_{i=1}^{d} \exp(S_i) = \exp\left(\sum_{i=1}^{d} S_i\right)$$

and categorical density is defined as:

$$\bar{\rho}_j \equiv N_j \exp\left(-\sum_{i=1}^{d} S_i\right).$$

When a mixture model starts with a poor choice of cluster centers, an expectation maximization process would tend to steer the distribution components towards higher density centers to eventually find a reasonable solution. In categorical space, the expectation maximization process is hindered by a lack of analytic representation that can leverage features of the distribution. Combined with the lack of a cluster center and a universal distance metric, the expectation maximization process can lead to poor results by converging to suboptimal distributions. To remedy the situation, example embodiments may be configured to start with initialization of the mixture model in order to begin the process with a large number of mixture components. From there, it is possible to proceed by iteratively using expectation-maximization to fit data at a given number of clusters (k), and pruning low density clusters using an entropy based density metric. An optimal solution may then be selected using an optimality criteria to determine, for example, if a particular entity is rare or novel. A full and detailed description of an algorithm that may be useful to execute the process described above will be provided below.

Consider, for example, cyber data may include a multitude of events and activities that may cover all different types of behavior from benign activities to malicious activities. Numerous efforts have been made to provide tools that can analyze the multitude of events and activities in order to identify those specific ones that merit the attention of analysts in order to identify and neutralize malicious activities. Signature based detection activities are included among these efforts, and they assume that malicious code may be similar to other, known malicious code. However, some malicious code may be entirely new. Thus, looking for similar codes to known malicious codes and also identifying rare or novel codes could be useful. However, when considering categorical data of the type that cyber data represents, particularly when considered over the massive volumes that are often involved, the problem of identifying those particular pieces of code that are best to have the analyst spend their precious time studying can be a significant challenge.

When one considers that the cyber activities have the potential for massively large differences in contents and the attributes of each activity, it can be appreciated that the records associated with the activities can be very difficult to review for a determination as to which activity to inspect more closely. As such, some example embodiments may provide a tool for identifying whether a particular entity (i.e., one of the records) is a normal record relative to other records that have been seen in the past (i.e., a known data set), while also clustering the particular entity along with all other entities associated with the data set. Example embodiments may therefore also, or alternatively, be configured to determine a classification of the record from a qualitative standpoint (i.e., whether the record is likely to be good or bad). In such examples, example embodiments may effectively determine whether the record is normal for a data set of good records (e.g., records associated with non-malicious activity) and therefore good, or normal for a data set of bad records (e.g., records associated with malicious activity) and therefore bad. Moreover, example embodiments may be able to identify data most similar to the data set of the record.

The examples above relate specifically to inspection of cyber data. Other examples could be applied in different contexts where categorical data is involved. For example, people, animals, plants, or virtually any other object that has a wide variety of attributes could be considered to determine whether the attributes associated with a particular entity being considered (e.g., an entity under test or consideration) is an anomaly relative to other entities of the category, while also clustering data of the data set involved. The ability may then exist, in short order and without any other knowledge required beyond the data that is descriptive of the entities themselves, to detect anomalies, cluster and classify entities. The detection, clustering and classification may be used to order more detailed inspections of anomalous entities, to evaluate or grade entities, or to instruct personnel to take a particular action relative to the entity under test.

As discussed above, as the number of attributes increase for categorical data, all data tends to look anomalous. Thus, determining whether any particular set of data (or entity) corresponds to data that has been seen before or is anomalous can become very difficult. Example embodiments enable use of a probabilistic approach to identifying anomalous or normal data even in very high dimensional contexts, while also enabling the data to be clustered appropriately. Accordingly, example embodiments may be employed to find, with very high accuracy, data sets that are either normal or abnormal to determine a measure of probability of data being novel and/or rare.

This approach can enable analysis and/or classification of data not only in the context of cyber security, but in a multitude of other contexts. For example, example embodiments can analyze data or records associated with financial transactions, shipping containers, electronic communications, people, animals, plants, products, connections, records, or any other data sets with high numbers of attributes for determining a measure of normality of a particular entity (e.g., a particular set of data or record). The particular entity may therefore be analyzed relative to a likelihood that the particular entity is normal relative to other entities that have been encountered in the past. If the other entities have a particular quality (e.g., good entities or bad entities), then the measure of normality for being good or bad can indicate whether the particular entity is likely to be good or bad. Thus, the particular entity can be analyzed for detecting fraud, detecting illegal transactions or activities, identifying people or things having particular qualitative aspects, and/or the like.

An example embodiment of the invention will now be described in reference to FIG. 1. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10.

Furthermore, in some cases, some embodiments may be practiced in connection with a single client connected to the system 10.

The example described herein will be related to an asset comprising a programmed computer or analysis terminal to illustrate one example embodiment. However, it should be appreciated that example embodiments may also apply to any asset including, for example, any programmable device that is capable of interacting with data received from portions of a network 30 (e.g., via a network access point 34) to monitor the communications between the network access point 34 and various network devices that may gather or generate data, or otherwise execute applications on or in association with the network 30 as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding individuals, locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with or over the network 30, and generating, storing, gathering or otherwise communicating data associated with an entity (e.g., a record, a product, a container, a person, a connection, or other thing that is characterized by a plurality of attributes as categorical data). As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SaaS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communications or handle distinct transactions or data, or the client applications 22 may all be engaged in similar activities. Regardless, the communications associated therewith may either generate data for consideration according to example embodiments or evaluate data being considered according to example embodiments.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information (e.g., in the database server 42) descriptive of certain data sets including entities previously encountered within a particular context. The information may also or alternatively include a program or series of executable files and/or instructions that are executable for analysis using a tool of an example embodiment. The application server 40 may host functionality for analyzing received data associated with an entity in accordance with an example embodiment. Alternatively or additionally, the application server 40 may be configured to provide analytical tools for use by the clients 20 to conduct such analysis in accordance with example embodiments.

In some embodiments, for example, the application server 40 may therefore include an instance of a density based clustering agent 44 comprising stored instructions for handling activities associated with practicing example embodiments as described herein. However, it should be appreciated that the density based clustering agent 44 could be a standalone device in some cases, so it need not be a part of a server or a server network. In some cases, the density based clustering agent 44 may be employed to analyze or monitor entities stored, generated or otherwise provided in association with the clients 20 by being instantiated thereat in the form of one of the client applications 22. However, the client applications 22 could alternatively provide entities for analysis by the density based clustering agent 44 at a central location, or in any other suitable configuration.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the density based clustering agent 44 configured to operate in accordance with an example embodiment of the present invention. In this regard, for example, the density based clustering agent 44 may include software for enabling the application server 40 to communicate with the network 30 and/or the clients 20 for the provision and/or receipt of information associated with activities performed in the network 30 or external activities, objects, transactions or the like that may be associated with an entity and can be analyzed and/or classified as described herein.

Figure 2:
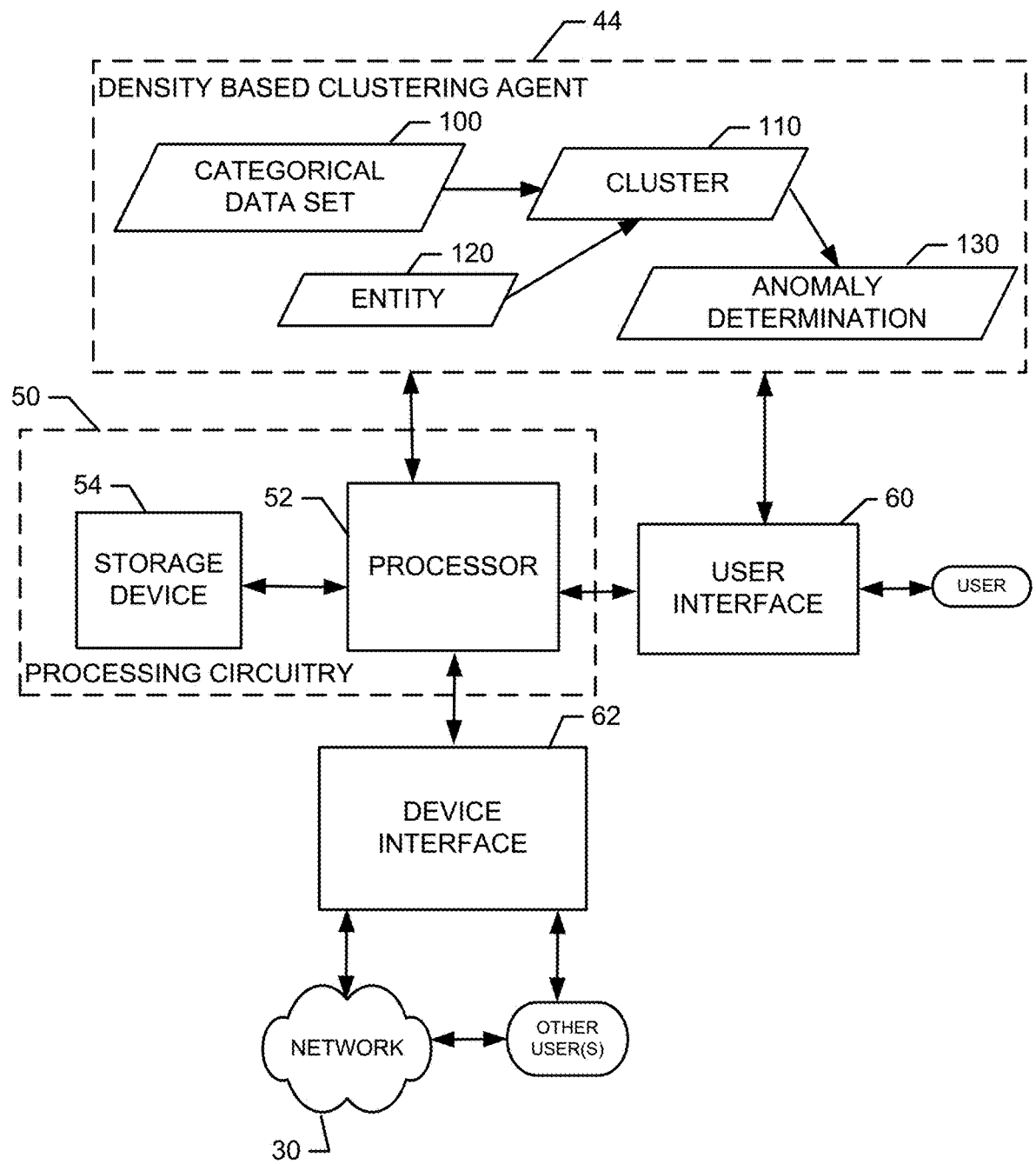
FIG. 2 illustrates a functional block diagram of an apparatus that may be useful in connection with clustering, analysis and/or classification of high dimensional data sets according to an example embodiment.

An example embodiment of the invention will now be described with reference to FIG. 2. FIG. 2 shows certain elements of an apparatus for provision of the normality determining capabilities described herein according to an example embodiment. The apparatus of FIG. 2 may be employed, for example, on a device such as, for example, a network device, server, proxy, or the like (e.g., the application server 40 of FIG. 1) at which the density based clustering agent 44 may be instantiated. Alternatively, embodiments may be employed on a combination of devices. Accordingly, some embodiments of the present invention may be embodied wholly at a single device (e.g., the application server 40) or in a distributed environment (e.g., at a plurality of servers of the server network 32 and/or at clients 20). Furthermore, it should be noted that the devices or elements described below may not be mandatory and thus some may be omitted in certain embodiments.

Referring now to FIG. 2, an apparatus for provision of mixture-model clustering and anomaly detection (e.g., normality determining) for analyzing entities in accordance with an example embodiment is provided. The apparatus may be an embodiment of the density based clustering agent 44 or a device hosting the density based clustering agent 44. As such, configuration of the apparatus as described herein may transform the apparatus into the density based clustering agent 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device (e.g., at a computer terminal or client device such as one of the clients 20) that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located. In some cases, the user interface 60 may also include a series of web pages or interface consoles generated to guide the user through various options, commands, flow paths and/or the like for control of or interaction with the density based clustering agent 44. The user interface 60 may also include interface consoles or message generation capabilities to send instructions (e.g., to inspect or otherwise further interrogate a particular entity), warnings, alarms, etc., and/or to provide an output that clearly indicates a degree of normality of data, a qualitative assessment (e.g., good, bad, correct, erroneous, legal, illegal, etc.), or an index of data to illustrate similar data to that which is associated with the entity.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the density based clustering agent 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the density based clustering agent 44 as described below.

The density based clustering agent 44 may be configured to analyze a categorical data set 100 to generate clusters 110 that comprise a weighted membership of all data points. Once the clusters 110 have been defined as described herein, the performance of many calculations with respect to any particular entity 120 (or the clusters 110 themselves) become relatively easy to perform. For example, the probability of any data point may be calculated in order to rank anomalies as the sum of the probability of the data point for each cluster weighted by the probability of that cluster. The nearest neighbors to any data point can be directly evaluated by comparing rankings of cluster membership. Thus, given an example of known bad (e.g., malicious) data, similar data can be quickly identified. Additionally, each of the clusters 110 can be treated as a basis vector, so that probabilities of membership in each of k clusters can represent a transformation of the original M categorical data attributes to a k-dimensional real-valued vector. The data, with this transformed representation, can be used as an input for any arbitrary analytic designed for real valued attributes.

Additionally, anomaly detection may also be performed to detect anomalies in accordance with two general approaches. For example, detection of the rarity of an entity (e.g., finding those activities/entities that are observed the least frequently in a set of observations), and/or detection of the novelty (e.g., finding activities/entities with a lowest estimated probability of observation based on prior observations of baseline (presumably "normal") data, can each be accomplished. The rarity approach lends itself to batch-mode analysis of a data set, since characterizing the probability of any data point requires analysis of all data points. However, the rarity approach can experience a weakness relative to detecting malicious activity, for example, in the context of a flurry of malicious attacks that are of similar character. The novelty approach, on the other hand, can be implemented in streaming mode since each data point can be immediately evaluated relative to an appropriate baseline. However, the novelty approach can also suffer weakness relative to a possibility that previously undetected malicious activity may be considered to be baseline data. Thus, it may be advantageous to employ both novelty and rarity detection as respective different instances of anomaly detection. In either case, the output of the density determiner and clustering agent may be deemed to be an anomaly determination 130 regarding the entity 120.

An anomaly determination 130 may be performed as just one step in detection of new bad activity in some contexts. For example, in connection with cyber security, detecting a new type of attack may not necessarily be directly correlated to detecting anomalous data. Instead, an analyst may be necessary to investigate the anomalous data to determine whether it indeed correlated to malicious behavior. However, the amount of data referred to analysts for investigation must be manageable. With the number of data sources and volume of data that is common in cyber security contexts, even low-probability anomaly thresholds can generate an overwhelming amount of data. In the novelty approach, additional tools can be used to correlate data found to be anomalous relative to the same baseline clustering. Anomalies generated by random processes would correlate with extremely low probability. Systematic anomalies, with high correlation, are unlikely unless a repeating, similar set of activities is being observed. These repeating activities may be strong malicious-activity candidates for investigation by analysts. The k cluster-membership probabilities calculated for each event facilitate rapid comparison of anomalies, either by direct pairwise comparison or by clustering the anomalies and detecting high density clusters.

The temporal stability of the baseline distribution captured by the clustering performed by the density based clustering agent 44 may be monitored dynamically during operation. For greater sensitivity to abnormal behavior, multiple baselines may be created for various different times (e.g., time of day, a day, a week, a month, etc.). The baseline behavior of a network can be expected to evolve over time as usage patterns change. By monitoring the distribution of incoming data relative to the baseline clusters, analysts can detect when an update to baseline clustering is required. In addition, sudden shifts in the monitored distributions may indicate changes in network configuration.

Variants of known malicious activity can be found by comparing the k cluster-membership probabilities of the "bad" data with all other data (e.g., communication traffic in a cyber-security context). This may enable the leverage of any malicious activity identified by existing sensors to develop cluster signatures to enable fuzzy detection variants that may escape detection of the original sensor.

The density based clustering agent 44 may be configured to cluster data points by the similarity of their attributes. The data can be arbitrarily pre-processed to generate data points with attributes that accentuate features of particular interest. In essence, the data can be "projected" into other spaces, by filtering or aggregating data (e.g., source IP address, source IP address/destination IP address pair, time interval for cyber-security contexts). The anomalies detected for each pre-processing approach will be different, and would detect potentially malicious data of different types. The density based clustering agent 44 may therefore serve as a core utility for cyber security, providing anomaly detection, similarity measures, and attribute transformation to real-valued vectors for sensor event-log data.

The attributes of many sensor event logs have a large number of possible categorical values (high cardinality). Events with multiple high-cardinality attributes will have low probability solely because of the sparsity of the coverage of potential attribute values. Port numbers and IP addresses are common examples. Domain knowledge may be used to group these values into a smaller set of possible values. Custom text fields may be an extreme example of this challenge, where a sensor may record text messages that are programmatically tailored to the context of the logged event. Text analytic approaches may be used to bin long text fields.

Zero-day attacks and variants of attacks that alter known signatures pose a continuing challenge to the defense of any national cyber infrastructure. The haystack of normal network traffic hiding these sharp needles is vast, varied and growing. Multiple perspectives on the data may therefore be very useful. Scalable and flexible tools for anomaly detection and similarity assessment are therefore needed to prioritize the investigation of suspicious activity. With linear scalability and state-of-the-art accuracy, the density based clustering agent 44 is able to meet this challenge. In terms of execution speed, scalability, repeatability, and robustness to parameter selection, the density based clustering agent 44 performs well. The execution speed may measure the processing time for a given operationally-relevant size of input data. The scalability may measure the increase processing time as a function of the increase in the data analyzed. The repeatability may assess the consistency of anomaly rankings (e.g., the anomaly determination 130) for repeated analysis of the same data starting from different random cluster centers. Lastly, the robustness may assess the sensitivity of the anomaly rankings to the algorithm options, such as the initial number of clusters and the criterion for optimizing k.

For the density based clustering agent 44, a generalization of mixture-models to categorical data, has been implemented and demonstrated for parallel processing on a scalable analytics platform. This implementation has been deployed on a distributed computing cluster and uses MapReduce to update the model throughout the fitting process. By instantiating the density based clustering agent 44 on a high performance computing architecture, fast parallel execution on large datasets can be accomplished by limiting the amount of message passing and its associated latency. The mixture model associated with the density based clustering agent 44 can be employed in an environment that will allow performance of parallelized computations with a model that evenly distributes work across a cluster.

Figure 3:
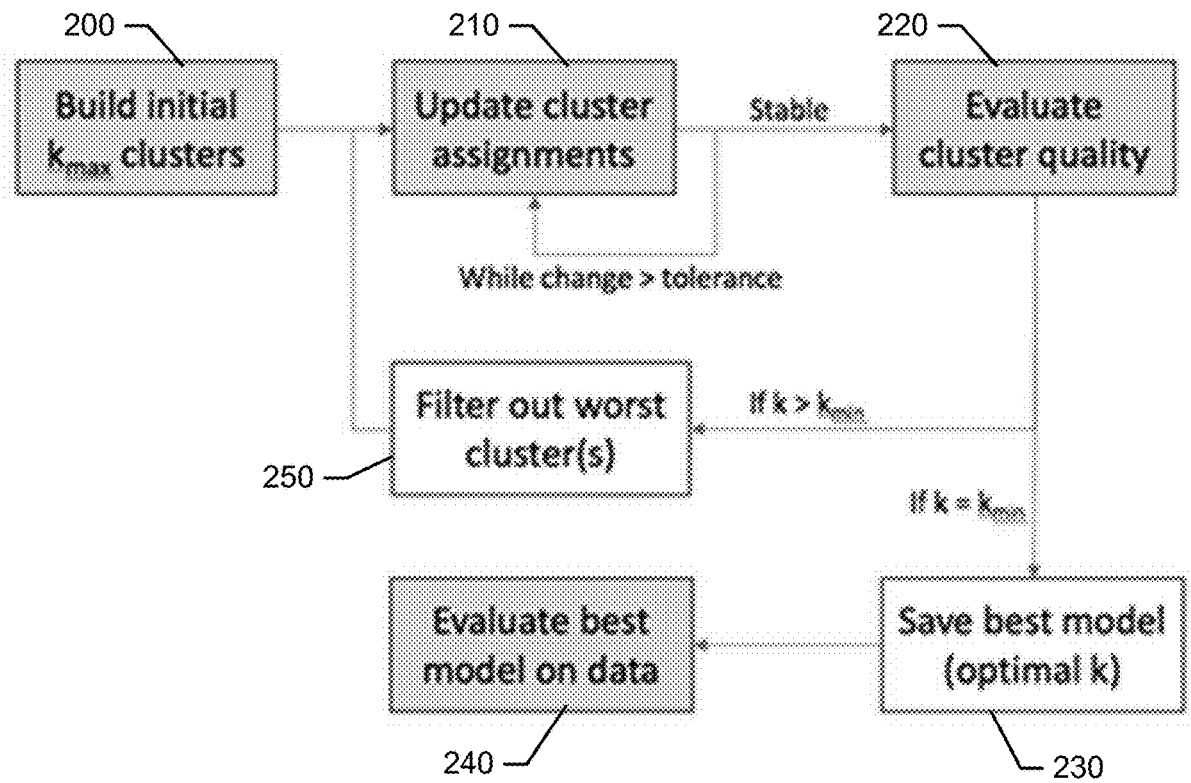
FIG. 3 illustrates a workflow diagram showing operations associated with identifying an optimal mixture model in accordance with an example embodiment.

The workflow diagrammed in FIG. 3 maps out some of the main steps the density based clustering agent 44 may be configured to perform, some of which lend themselves to MapReduce computations that the environment can perform quickly and robustly. In this regard, at operation 200, initial clusters may be built. Thereafter, cluster assignments may be updated at operation 210. The updating may continue for so long as any change is greater than an allowable tolerance to detect stability. If stability is achieved, then an evaluation of cluster quality may be performed at operation 220. If k=kmin, then the best model may be saved at operation 230, and data may be evaluated on the best model at operation 240. However, if k>kmin, then the worst clusters may be filtered out at operation 250, and updating of cluster assignments may be performed again.

The MapReduce steps that require evaluating the model, either for updating cluster assignments or finding the optimal model, scale as O(KMN) for a dataset with K clusters and N data points, each with M attributes. This linear scaling allows the density based clustering agent 44 to analyze the large datasets with many attributes. The biggest computational challenge in this task will be optimizing the model evaluation procedure—since the model must be evaluated many times during this process, optimization of this procedure will be an important task. For each data point, the density based clustering agent 44 may look up the count associated with each attribute for each cluster, a total of K×M lookups. If these are not done efficiently, then this will be a very burdensome and slow process. However, by using appropriate methods and data structures, it is possible to greatly reduce the time of this procedure.

Deploying the density based clustering agent 44 on an high performance computing system will provide extremely fast model evaluation; computation and communication times are minimized along with taking advantage of massive parallelizability. Since the density based clustering agent 44 determines clusters 110 that are independent and assume independence of the attributes the model evaluation/update steps can be parallelized at least by a factor of N (number of data points), with sub-steps allowing further parallelization by factors of K (number of clusters) and M (number of attributes).

The density based clustering agent 44 may be configured to perform streaming evaluation relative to a stream of entities 120 that are added to the model, clustered, and evaluated for normality in real-time or near-real-time. This will allow the model to adapt to new trends in the data as they appear. Aging of old data can also be incorporated into a model update procedure. The density based clustering agent 44 may have the capability to rank input data by probability relative to a previous baseline (e.g., to find cyber-security relevant unusual events), assess the similarity between detected anomalous events (e.g., to detect potentially repeated malicious activities), and flag events with high similarity to known malicious events identified by signature-based detection systems for enhancing threat, network, and mission awareness of malicious variants that evade detection by signature-based systems.

Referring again to FIG. 2, the density based clustering agent 44 may generate the clusters 110, which can then be used to analyze the entity 120 (e.g., data from the categorical data set 100 or data that is to be compared to the categorical data set 100) to determine anomaly determination 130 for the entity 120 relative to the categorical data set 100. The clusters 110 may be used to infer probability of data that has never been observed before (and therefore also probability that the data is normal and routine relative to prior observations). Thus, the clusters 110 are effectively a tool for anomaly detection within a high dimensional data set context. However, the clusters 110 can be generated directly from the categorical data set 100 no matter what data the categorical data set 100 represents. Accordingly, for any new data set, clusters 110 can be generated, and anomaly detection can be accomplished to maximize the probability of observed data while providing inference capability for previously unseen data.

The anomaly determination 130 may indicate a degree of relative normalcy for the entity 120 with respect to the other data of the categorical data set 100. Thus, for example, the anomaly determination 130 may effectively have a dependency on a quality, characteristic or attribute that is shared by or inherent to the categorical data set 100 if the categorical data set 100 is selected to include data that corresponds to entities that have the shared or inherent quality, characteristic or attribute. As such, if all of the entities of the categorical data set 100 are positive or good exemplars, then the anomaly determination 130 may be correlated to positivity or goodness of the entity 120 within the same context. In such an example, a high score for the anomaly determination 130 may indicate a high likelihood that the entity 120 is also positive or good for the quality in question. If, to the contrary, the entities of the categorical data set 100 are negative or bad exemplars, then the anomaly determination 130 may be correlated to negativity or badness of the entity 120 within the same context. In such an example, a high score for the anomaly determination 130 may indicate a high likelihood that the entity 120 is also negative or bad for the quality in question. Accordingly, the normality rating 130 indicates the degree to which the entity 120 is a normal exemplar or is normal relative to the other entities that make of the categorical data set 100.

The correlation of anomaly determination 130 to an indication of normalcy or abnormality could be set up via any desirable paradigm. Thus, in some paradigms a high score for the anomaly determination 130 may indicate that the entity 120 is normal relative to the categorical data set 100, and a low score for the anomaly determination 130 may indicate that the entity 120 is abnormal relative to the categorical data set 100. However, the opposite could alternatively be true in some paradigms. In still other paradigms, distance from a reference could be used as the measure of degree or normalcy, or still other methods could be employed.

As noted above, a new definition of density is required to facilitate operation of the density based clustering agent 44. This is because, as noted above, when a mixture model is initialized with components far from high-density regions, expectation-maximization processes tend to steer the components toward regions of higher density to eventually find a reasonable solution. In categorical space, the expectation-maximization process may be hindered by a lack of analytic representation that can leverage features of the distribution. Combined with the lack of a component center and a universal distance metric, the expectation-maximization process can lead to poor results by converging to sub-optimal distributions. To remedy this problem, example embodiments follow an approach that starts with a high number of components in the mixture model and uses a fitness criterion and pruning process to remove low-quality components.

Figure 4A:
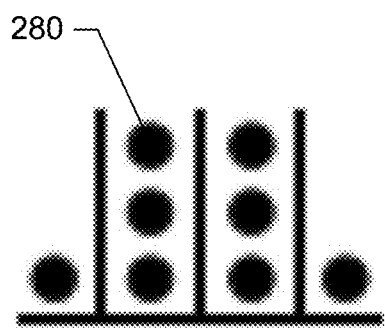
FIG. 4A illustrates a first distribution paradigm to illustrate the value of considering density in relation to clustering data according to an example embodiment.
Figure 4B:
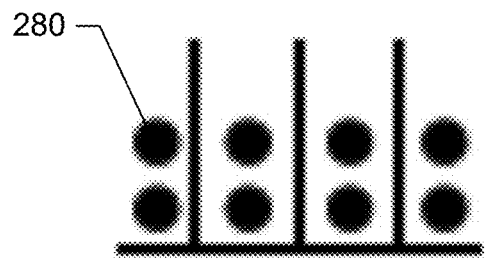
FIG. 4B illustrates a second distribution paradigm to illustrate the value of considering density in relation to clustering data according to an example embodiment.

The fitness criterion used in pruning of low-quality components is given by a generalized density metric. For example, if the one dimensional distributions of FIG. 4A and FIG. 4B are considered, it can be seen that a same number of data points 280 distributed over a same domain can have different distributions. Whereas a naïve Cartesian density metric, defined as a number of particles per unit length, for these two distributions is identical, the distribution of FIG. 4B is clearly not as "dense" as the distribution in FIG. 4A. In other words, the distribution in FIG. 4B is more uniform, whereas the distribution of FIG. 4A has areas of higher density than others. If an effective length d is defined for the axis of the distributions shown in FIGS. 4A and 4B, using the entropy of the distribution, equations (1) and (2) below can be defined as:

$$d \equiv \exp(S), \quad (1)$$

$$S = -\sum_{a=1}^{N} p_a \log p_a. \quad (2)$$

With this definition for the effective length, the length of the distributions of FIGS. 4A and 4B can be given by $d_L$-3.51 and $d_R$=, such that the densities ($\rho = \overline{N}/d$) are $\rho_L$=2.28>$\rho_R$=2.

As this simple example illustrates, the density definition favors the distribution of FIG. 4A. This definition of density (i.e., equation (1)) applies to both numerical data and categorical data. For example, in a Gaussian distribution, the exponentiation of the differential entropy is proportional to the standard deviation of the distribution, i.e., $$\sigma = \frac{1}{\sqrt{2\pi e}} \exp(S). \quad (3)$$

It is possible to show that many distributions also have a similar relationship between standard deviation and entropy (e.g., $\sigma$=exp(S-1) for an exponential distribution and $\sigma$=exp(S)/($\sqrt{2e}$) for a Laplace distribution). Extending the entropy-based effective length specification to higher dimensions, the entropy based effective volume of a hypercube in attribute space, with M attributes, can be defined as $$V = \prod_{m=1}^{M} d_m = \prod_{m=1}^{M} \exp(S_m) = \exp\left(\sum_{m=1}^{M} S_m\right), \quad (4)$$

which leads to a definition of a generalized density in higher dimensions, $$\rho \equiv \frac{N}{V} = N \exp\left(-\sum_{m=1}^{M} S_m\right). \quad (5)$$

Although it is possible to use the definition of density given in equation (5) for both categorical and numerical variables, the numerical subspace requires some care in how entropies are defined. If a multivariate distribution has a high degree of correlation between its variables, treating variables as independent leads to an over-estimation of the effective volume as off-diagonal regions are sparsely populated. Therefore, it is more appropriate to define the volume of the numerical subspace in terms of entropies along the principal axes defined by principal component analysis (PCA). Looking to the relationship between entropy and standard deviation (i.e., equation (3)) for guidance, the entropies of numerical subspace along principal components can be estimated using $$S_q = \log(\sqrt{\lambda_q}), \quad (6)$$

where $\lambda_q$ represent eigenvalues of the covariance matrix for numerical attributes.

Definition of the entropy-based density (i.e., categorical density) implies that a uniform distribution leads to a density of 1 independent of the size and shape of the cube for data without duplicates. Furthermore, in this case of data without duplicate points, the density is bounded by 1, a constraint that flows from Shannon's entropy inequality. For a cube of N particles without duplicates, the joint entropy, S, is given by $$p_a = \frac{1}{N}, \quad (7)$$

$$S = -\sum_{a=1}^{N} p_a \log p_a = \log N, \quad (8)$$

where $p_a$ is the probability of an individual particle. The entropy of a multivariate distribution follows the inequality $$S \leq \sum_{m=1}^{M} S_m \quad (9a)$$

$$\log N \leq \sum_{m=1}^{M} S_m \quad (9b)$$

$$N \leq \exp\left(\sum_{m=1}^{M} S_m\right) \quad (9c)$$

$$\rho \leq 1. \quad (9d)$$

Having defined a metric through equations, (2), (4) and (5) to measure the quality of an individual component, the use of the individual component within the context of a mixture model can be discussed relative to generation of high-density components in categorical space.

A mixture model is defined by a superposition of probability distributions for k components, $$Pr(x) = \sum_{i=1}^{k} Pr(x | C_i) Pr(C_i), \quad (10)$$

where each component distribution, C, is subject to the normalization condition, $$1 = \sum_{x_j \in C} Pr(x_j | C), \quad (11)$$

and the components priors determine the relative size of each of the components, $$1 = \sum_{i=1}^{k} Pr(C_i). \quad (12)$$

The individual component distributions can be modeled by any suitable distribution depending on the problem and types of data attributes involved. When the attributes are all categorical, a high-dimensional nonparametric distribution based on a clique tree may be used to estimate the full joint probability. Such a distribution is a good option when data has sub-spaces where attributes are highly correlated. However, since individual component distributions are not required to model the entire space, but only a dense region, a complex structure for individual components is not necessary. Correlations within dense regions are much less significant and a naïve assumption of attribute independence inside a component is typically sufficient. The fact that a mixture model comprises many components captures the structure of correlations that a clique tree represents. Therefore, the naïve probability for a data point with M attributes to be a member of a component is given by $$Pr(x_a | C_i) = \prod_{m=1}^{M} Pr(x_{am} | C_i). \quad (13)$$

Each component contains a discrete probability distribution for each attribute of the dataset. Numerical attributes may be considered at this time by discretizing them and treating them as categorical. Alternatively, numerical subspaces can be represented using a multivariate distribution as may be done in the Gaussian mixture model. However, example embodiments may focus instead on a generalized categorical mixture model.

Figure 5:
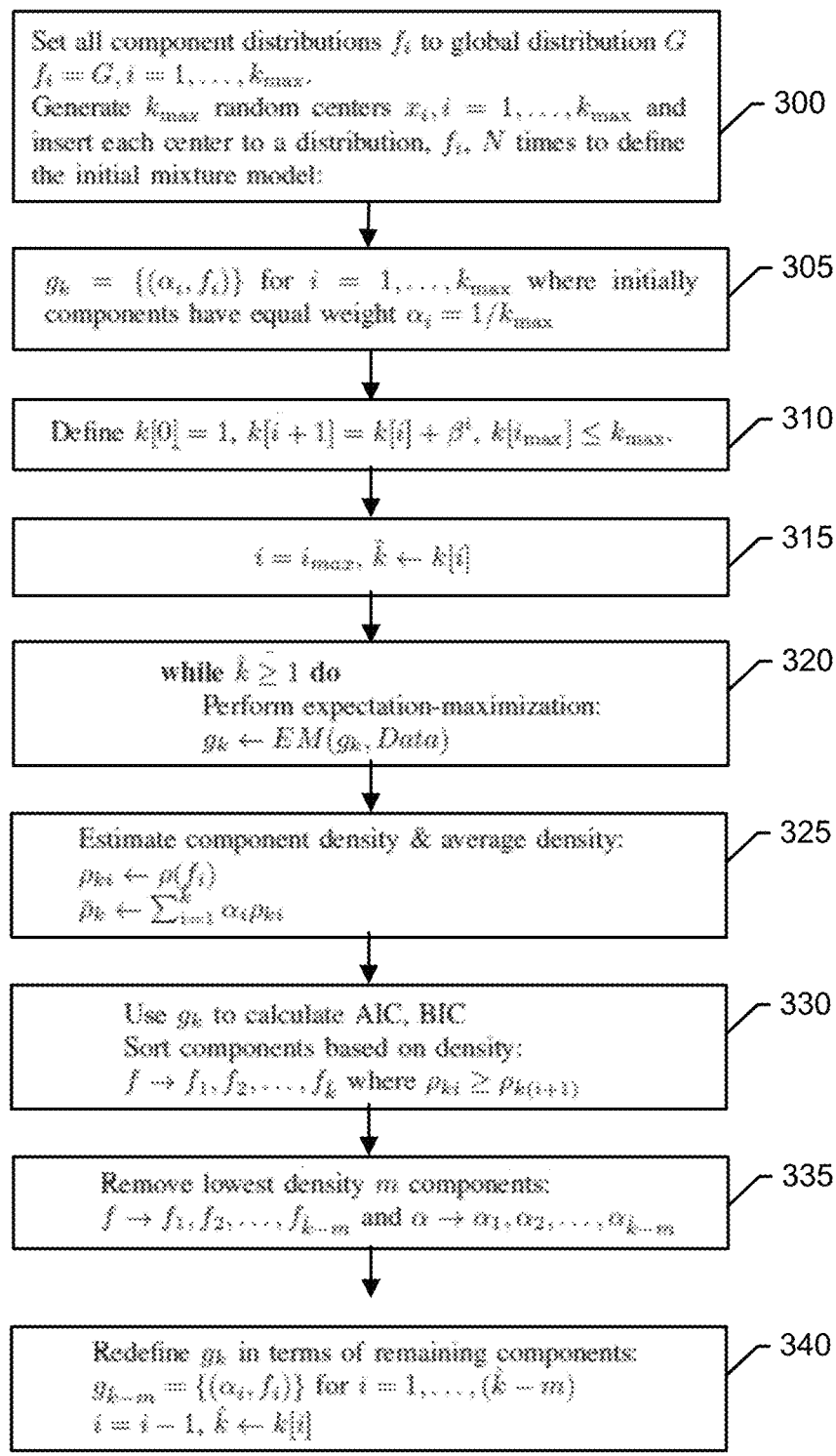
FIG. 5 illustrates a method of identifying an optimal mixture model according to an example embodiment.

FIG. 5 illustrates a block diagram of an algorithm the density based clustering agent 44 may be configured to execute in accordance with an example embodiment. The density based clustering agent 44 may be configured to initialize the mixture model with a large number of components, $k_{max}$. The initialization of the components (i.e., clusters) may be performed by generating random component/cluster "centers" according to the global distribution of the data. Since initial components need a probability distribution (and a single center point does not provide that), an equally-weighted average of the global distribution may be used with the randomly generated component center. In other words, each component may start with the probability distribution given by all N data points plus a random center inserted a further N times. In relation to execution of the algorithm of FIG. 5, initialization may include operation 300, operation 305, operation 310 and operation 315.

Following creation of the initial components, the density based clustering agent 44 may be configured to iteratively: 1) use expectation-maximization to fit the distribution to data at a given k, 2) sort the mixture components using the categorical density metric (of equation (5)), and 3) prune the lowest density components, until the number of components has been reduced to 1. These iterative steps are shown in operations 320, 325, 330, and 335 in FIG. 5, and effectively comprise steps for density based annealing. Component memberships are evaluated in a probabilistic manner by assigning each data point fractionally to each component at operation 340. This fractional assignment is given by the posterior probability of a measurement belonging to a component, which follows from Bayes' theorem as $$Pr(C_i | x_a) = \frac{Pr(x_a | C_i) Pr(C_i)}{Pr(x_a)}. \quad (14)$$

An optimal solution for k is then selected using an optimally selected criterion as discussed in greater detail below.

There are general rules of thumb about the relationship between the optimal number of components $k^\star$, and the number of data points, N. However, in general, it is not possible to make a definitive statement about such a relationship. Experimental results show that $k_{max}$ should be picked such that $k_{max}$ is at least twice as large as the expected number of optimal components, $k^\star$. This choice gives the density based annealing process the opportunity to converge to the optimal solution consistently. Larger values of $k_{max}$ will not affect the value of but will take longer to converge due to more steps being required.

In practice, the following procedure may be used to step down from $k_{max}$. By choosing a parameter $\beta \geq 1$, inspection of the set of values of k that are defined by the relationship $$k[i+1] = \lfloor k[i] + \beta^i \rfloor \quad (15)$$

can be accomplished, where $k[0]=1$, and $k[i_{max}] \leq k_{max}$. The parameter $\beta$ determines how finely the optimization number of components is performed. Using such a rule, the number of possible mixture models inspected scales as $\log(k_{max})$.

For each value of k, an expectation maximization procedure may be performed to converge to a solution using available components at the corresponding level. Next, the quality of the mixture model solution may be measured. Two commonly used metrics for model selection include the Akaike Information Criterion (AIC) and Bayesian Information Criterion (BIC). These are given by $$AIC = 2\nu - 2 \log(L),$$

$$BIC = \log(N)\nu - 2 \log(L)$$

where $\nu$ is the degrees of freedom of the model. In addition to the AIC and BIC, the size-weighted average density of the components, $$\bar{\rho} = \sum_{i=1}^{k} \alpha_i \rho_i. \quad (16)$$

where $$\alpha_i = \frac{1}{N} \sum_{a=1}^{N} Pr(C_i | x_a) \quad (17)$$

and $Pr(C_i | x_a)$ is given by equation (14) above, with $Pr(C_i) = \alpha_i$ and initially $\alpha_i = 1/k_{max}$ as the process starts with $k_{max}$ components. Whereas one may seek to minimize AIC or BIC, it may be desirable to maximize the average density, $\bar{\rho}$, of the mixture model. The choice of which to use is up to the user.

Figure 6:
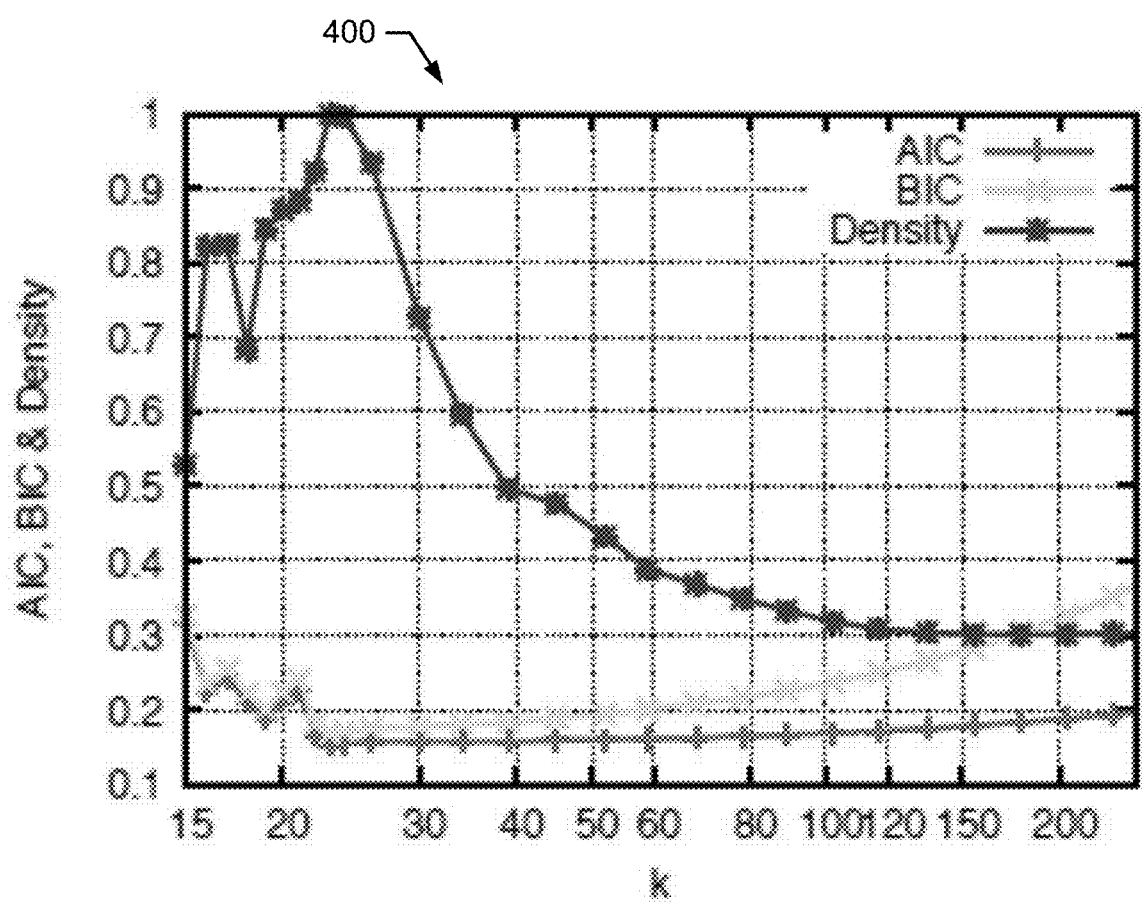
FIG. 6 illustrates a chart of various optimization factors relative to the number of clusters of the mixture model according to an example embodiment.

The algorithm of FIG. 5, and the methods described above, can be applied to high dimensional data of many types. In one example, a dataset comprising physical properties of 8124 mushrooms, along with their edibility, was studied. The dataset included 22 categorical attributes in addition to the binary attribute of edibility. The categorical attributes each had up to twelve possible values, where the attributes describe various properties such as color, odor, shape, etc. All attributes were used for clustering. FIG. 6 illustrates a chart 400 of AIC, BIC and density vs k that result when clustering the dataset. All three metrics agree that $k^\star = 23$, although there are visible differences in how clear the selection is. It is also worth noting that $\bar{\rho} = 1$ for $k^\star = 23$. Recall that for data that has no duplicates, the theoretical upper limit on the density of a cluster according to the inequality of equation (9d) above is 1. Thus, this optimal solution corresponds to clusters that contain only all edible or all poisonous mushrooms. Reaching the maximum average density of 1 in a generic clustering problem when data is categorical is clearly not always achievable.

Figure 7:
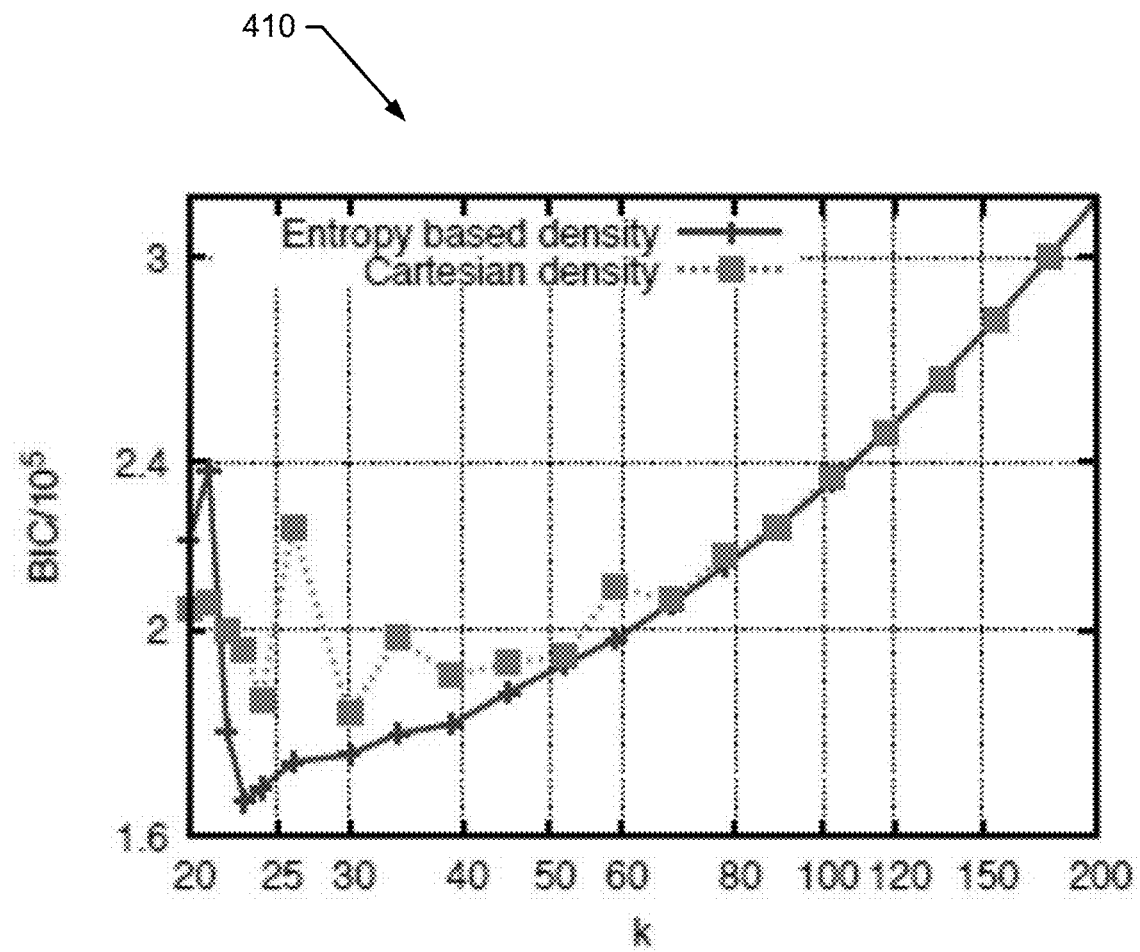
FIG. 7 illustrates a plot of Cartesian density versus entropy based (i.e., categorical) density according to an example embodiment.

The role of density in obtaining this result can be understood by changing the pruning criteria from the entropy-based density to a naïve Cartesian density as shown in chart 410 of FIG. 7. The example of FIG. 7 demonstrates that when a simplistic Cartesian density is used, it is not possible to reach an optimal result, instead finding that $k^\star=30$. Whereas the results are comparable for high values of k, the Cartesian density is less able to determine which clusters are best to prune as the number of clusters begins to approach $k^\star$.

Figure 8:
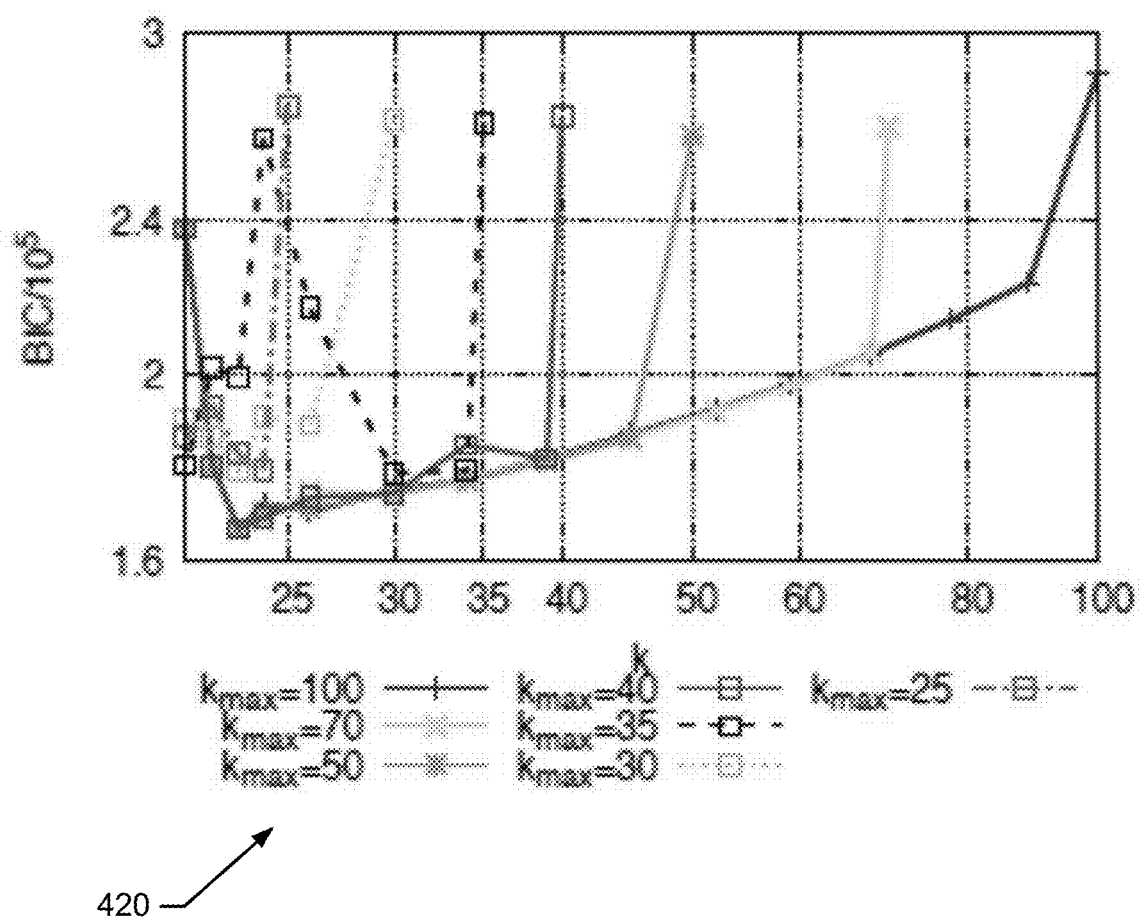
FIG. 8 illustrates a chart of dependence of reaching a global minimum in initial cluster size for a dataset in accordance with an example embodiment.
Figure 9:
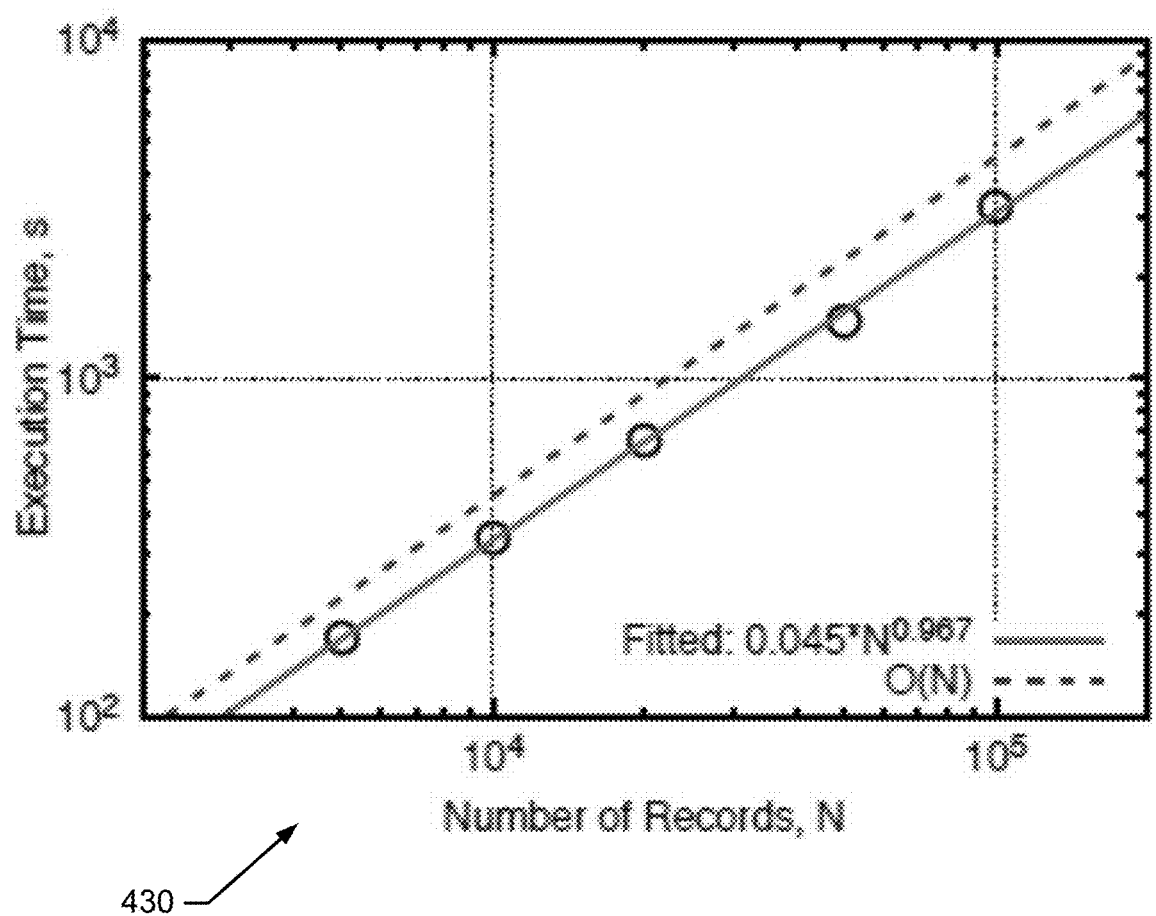
FIG. 9 illustrates a chart of a scaling of execution speed with respect to a number of records (i.e., entities) for synthetic data with a fitting performed for $N \geq 10^3$ to minimize effects of overhead present at low N in accordance with an example embodiment.

Another consideration in the execution of the algorithm is the choice of $k_{max}$. Results shown in the chart 420 of FIG. 8 illustrate that as long as $k_{max} \leq 40$, the annealing process converges to the same optimal result $k^\star=23$. If $k_{max}$ is set lower, the annealing process does not have sufficient time to converge to the optimal solution. Similar behavior can be observed on other datasets tested and generally find that using a starting point that is at least twice the expected number of clusters is a good rule of thumb to reach an optimal solution. Thus, results shown in FIGS. 7 and 8 show that both annealing and using entropy-based density metrics (i.e., categorical density) contribute to achieving optimal results. FIG. 9 illustrates a chart 430 of a scaling of execution speed with respect to a number of records (i.e., entities) for synthetic data with a fitting performed for $N \geq 10^3$ to minimize effects of overhead present at low N in accordance with an example embodiment.

Accordingly, example embodiments may generate mixture models in linear time for data with categorical attributes by employing an entropy-based density metric in categorical space and annealing high-entropy/low-density components from an initial state with many components. Pruning of low-density components using entropy-based density (i.e., categorical density) may enable example embodiments to consistently find high quality clusters, and the same optimal number of clusters. Example embodiments perform clustering by assigning each data point to its most probable component or cluster in the $k^\star$ components in the optimal mixture model, $gk^\star$.

From a technical perspective, the density based clustering agent 44 described above may be used to support some or all of the operations described above. As such, the platform described in FIGS. 1-2 may be used to facilitate the implementation of several computer program and/or network communication based interactions. As an example, FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., application server 40, client 20 and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 9, may include initializing a mixture model having a number of clusters including categorical data at operation 500, iteratively updating cluster assignments, evaluating cluster quality based on categorical density of the clusters, and pruning clusters that have low categorical density at operation 510, and determining an optimal mixture model based on the pruned clusters at operation 520.

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the method may further include an optional operation of performing an anomaly determination for an entity relative to the categorical data based on the optimal mixture model at operation 530. Additionally or alternatively, the method may include generating an output to a user terminal based on the anomaly determination, where the output indicates whether the entity is an anomaly, a classification of the entity, or where the output is an alarm, an alert, or an instruction to take an action relative to the entity. In an example embodiment, the categorical data may be high dimensional data, and initializing the mixture model comprises generating a random center for each cluster. In some cases, pruning clusters comprises pruning the clusters based on density until one cluster remains. In an example embodiment, determining the optimal mixture model comprises determining a maximum average categorical density of the mixture model. In some cases, determining the optimal mixture model comprises determining a minimum Akaike Information Criterion or Bayesian Information Criterion of the mixture model. In an example embodiment, the number of clusters is selected to be at least twice as large as an expected optimal number of clusters.

Figure 10:
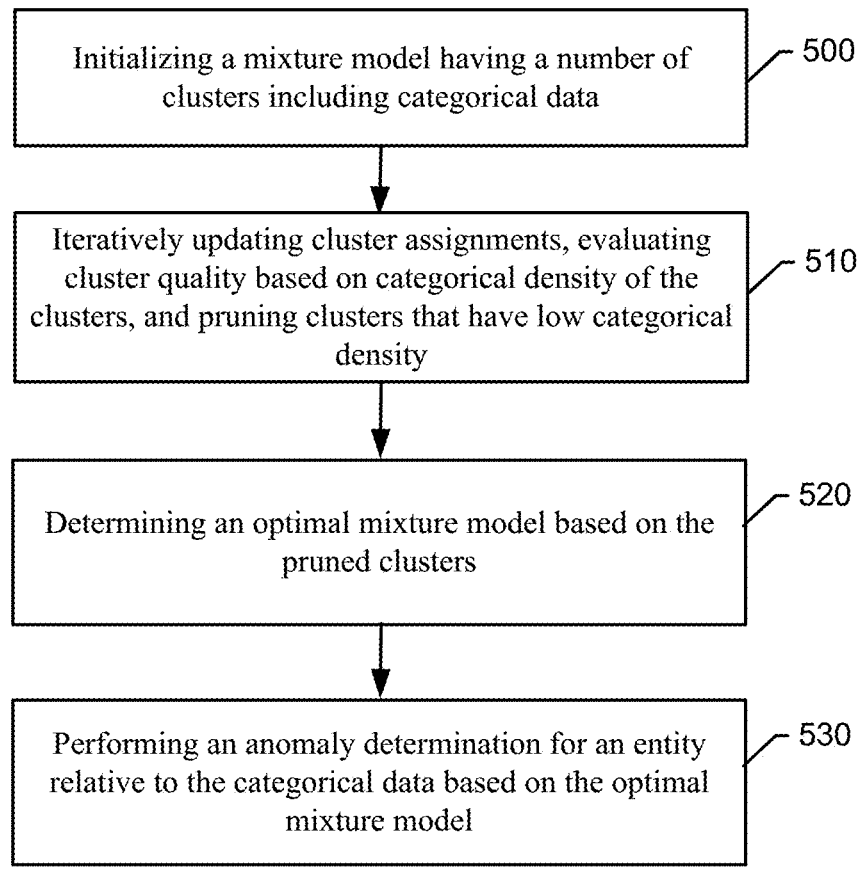
FIG. 10 illustrates a method for detection of processing categorical data in accordance with an example embodiment.

In an example embodiment, an apparatus for performing the method of FIG. 10 above may comprise a processor (e.g., the processor 52) or processing circuitry configured to perform some or each of the operations (500-530) described above. The processor may, for example, be configured to perform the operations (500-530) by performing hardware implemented logical functions, executing stored instructions, or executing algorithms for performing each of the operations. In some embodiments, the processor or processing circuitry may be further configured for the additional operations or optional modifications to operations 500 to 530 that are discussed above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus comprising processing circuitry configured to execute instructions that, when executed, cause the apparatus to:
   initialize a mixture model having a plurality of clusters associated with categorical data, wherein the categorical data is high dimensional data;
   wherein initializing the mixture model comprises generating a random center for each cluster, the plurality of clusters being initially provided based on a global probability distribution of the categorical data within a categorical volume defined as a function of entropy;
   iteratively update cluster assignments, evaluate cluster quality based on a categorical density of the clusters, and prune clusters that have low categorical density, wherein the processing circuitry is configured to iteratively update the cluster assignments by reassigning portions of the categorical data previously associated with the pruned clusters to remaining clusters of the plurality of clusters after the pruning;
   determine an optimal mixture model based on the pruned clusters;
   wherein the categorical density is defined as a function of entropy; and
   perform an anomaly determination for an entity relative to the categorical data based on the optimal mixture model and a relative position of the entity to the clusters of the optimal mixture model within the categorical volume.

2. The apparatus of claim 1, wherein pruning the clusters comprises pruning the clusters based on categorical density until one cluster remains.

3. The apparatus of claim 1, wherein the processing circuitry is further configured to generate an output to a user terminal based on the anomaly determination, the output indicating whether the entity is an anomaly.

4. The apparatus of claim 1, wherein the processing circuitry is further configured to generate an output to a user terminal based on the anomaly determination, the output indicating a classification of the entity.

5. The apparatus of claim 1, wherein the processing circuitry is further configured to generate an output to a user terminal based on the anomaly determination, wherein the output comprises an alarm, an alert, or an instruction to take an action relative to the entity.

6. The apparatus of claim 1, wherein determining the optimal mixture model comprises determining a maximum average categorical density of the mixture model.

7. The apparatus of claim 1, wherein determining the optimal mixture model comprises determining a minimum Akaike Information Criterion or Bayesian Information Criterion of the mixture model.

8. The apparatus of claim 1, wherein the number of clusters is selected to be at least twice as large as an expected optimal number of clusters.

9. A method executable via operation of configured processing circuitry, the method comprising:
   initializing a mixture model having a plurality of clusters associated with categorical data, wherein the categorical data is high dimensional data,
   wherein initializing the mixture model comprises generating a random center for each cluster, the plurality of clusters being initially provided based on a global probability distribution of the categorical data within a categorical volume defined as a function of entropy;
   iteratively updating cluster assignments, evaluating cluster quality based on a categorical density of the clusters, and pruning clusters that have low categorical density, wherein iteratively updating the cluster assignments comprises reassigning portions of the categorical data previously associated with the pruned clusters to remaining clusters of the plurality of clusters after the pruning;
   determining an optimal mixture model based on the pruned clusters;
   wherein the categorical density is defined as a function of entropy; and
   performing an anomaly determination for an entity relative to the categorical data based on the optimal mixture model and a relative position of the entity to the clusters of the optimal mixture model within the categorical volume.

10. The method of claim 9, wherein pruning the clusters comprises pruning the clusters based on categorical density until one cluster remains.

11. The method of claim 9, further comprising generating an output to a user terminal based on the anomaly determination, the output indicating whether the entity is an anomaly.

12. The method of claim 9, further comprising generating an output to a user terminal based on the anomaly determination, the output indicating a classification of the entity.

13. The method of claim 9, further comprising generating an output to a user terminal based on the anomaly determination, wherein the output comprises an alarm, an alert, or an instruction to take an action relative to the entity.

14. The method of claim 9, wherein determining the optimal mixture model comprises determining a maximum average categorical density of the mixture model.

15. The method of claim 9, wherein determining the optimal mixture model comprises determining a minimum Akaike Information Criterion or Bayesian Information Criterion of the mixture model.

16. The method of claim 9, wherein the number of clusters is selected to be at least twice as large as an expected optimal number of clusters.

* * * * *